United States Patent
Gupta et al.

(10) Patent No.: US 10,885,023 B1
(45) Date of Patent: Jan. 5, 2021

(54) ASYNCHRONOUS PROCESSING FOR SYNCHRONOUS REQUESTS IN A DATABASE

(71) Applicant: Amazon Technologies, Inc., Reno, NV (US)

(72) Inventors: Anurag Windlass Gupta, Atherton, CA (US); Alexandre Olegovich Verbitski, Woodinville, WA (US); Kamal Kant Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1021 days.

(21) Appl. No.: 14/480,335

(22) Filed: Sep. 8, 2014

(51) Int. Cl.
*G06F 16/24* (2019.01)
*G06F 3/06* (2006.01)

(52) U.S. Cl.
CPC ............ *G06F 16/24* (2019.01); *G06F 3/0613* (2013.01); *G06F 3/0655* (2013.01); *G06F 3/0673* (2013.01)

(58) Field of Classification Search
CPC .............................. G06F 16/24; G06F 9/4843
See application file for complete search history.

(56) References Cited

U.S. PATENT DOCUMENTS

| | | | |
|---|---|---|---|
| 5,410,700 A | 4/1995 | Fecteau et al. | |
| 5,758,184 A * | 5/1998 | Lucovsky | G06F 9/52 710/6 |
| 6,138,143 A | 10/2000 | Gigliotti et al. | |
| 6,151,602 A * | 11/2000 | Hejlsberg | H04L 67/06 |
| 6,182,109 B1 * | 1/2001 | Sharma | G06F 9/5027 709/203 |
| 6,453,356 B1 * | 9/2002 | Sheard | G06F 8/34 709/231 |
| 6,542,920 B1 * | 4/2003 | Belkin | G06F 9/5055 707/999.01 |
| 8,209,702 B1 * | 6/2012 | Roytman | G06F 9/5027 718/106 |
| 8,375,359 B2 | 2/2013 | Somogyi et al. | |
| 8,499,298 B2 | 7/2013 | Mitchell et al. | |
| 8,606,833 B2 | 12/2013 | Hickson | |
| 8,639,677 B2 | 1/2014 | Pruet, III | |
| 2002/0194015 A1 * | 12/2002 | Gordon | G06F 16/273 705/1.1 |

(Continued)

*Primary Examiner* — Apu M Mofiz
*Assistant Examiner* — Farhad Agharahimi
(74) *Attorney, Agent, or Firm* — Robert C. Kowert; Kowert, Hood, Munyon, Rankin & Goetzel, P.C.

(57) ABSTRACT

A database system may implement asynchronous processing for synchronous requests received at the database. A pool of request processing threads may be maintained. As access requests for the database are received from clients, an available request processing thread in the pool may process the access request. The access request may be dependent on a persistent storage I/O operation, such that processing of the access request waits at least until the persistent storage I/O operation is complete. The request processing thread may perform processing operations for the access request so that persistent storage I/O operation is performed and become available to process other access requests. A response processing thread may determine that the persistent storage I/O operation for the access request is complete, and send a response to the client.

20 Claims, 12 Drawing Sheets

(56) References Cited

U.S. PATENT DOCUMENTS

| | | | |
|---|---|---|---|
| 2005/0149934 A1* | 7/2005 | Doolittle | G06F 9/5027 718/100 |
| 2006/0136930 A1* | 6/2006 | Kaler | G06F 9/4843 718/105 |
| 2006/0248207 A1* | 11/2006 | Olson | G06F 9/5027 709/230 |
| 2007/0220515 A1* | 9/2007 | Dewitt, Jr. | G06F 9/505 718/100 |
| 2009/0199181 A1* | 8/2009 | Arimilli | G06F 9/4843 718/100 |
| 2013/0042156 A1* | 2/2013 | Srinivasan | G06F 11/1443 714/54 |
| 2014/0195564 A1* | 7/2014 | Talagala | G06F 12/0804 707/802 |

\* cited by examiner

ASYNCHRONOUS PROCESSING FOR SYNCHRONOUS REQUESTS IN A DATABASE

BACKGROUND

As increasing amounts of data are stored and maintained for a variety of different purposes, optimizing the performance of access requests and other operations performed by database systems with regard to stored data is becoming increasingly important when handling larger amounts of data and greater numbers of access requests. Access requests may depend upon performing operations that access persistent storage devices. Accessing persistent storage devices (e.g., hard disk drives) is often significantly slower than other operations for access requests which can be performed without persistent storage access. Database engines may manipulate the number of threads or similar execution agents to ensure that access requests received at a database engine are not waiting on the processing of other access requests that have stalled due to persistent storage access.

Figure 1:
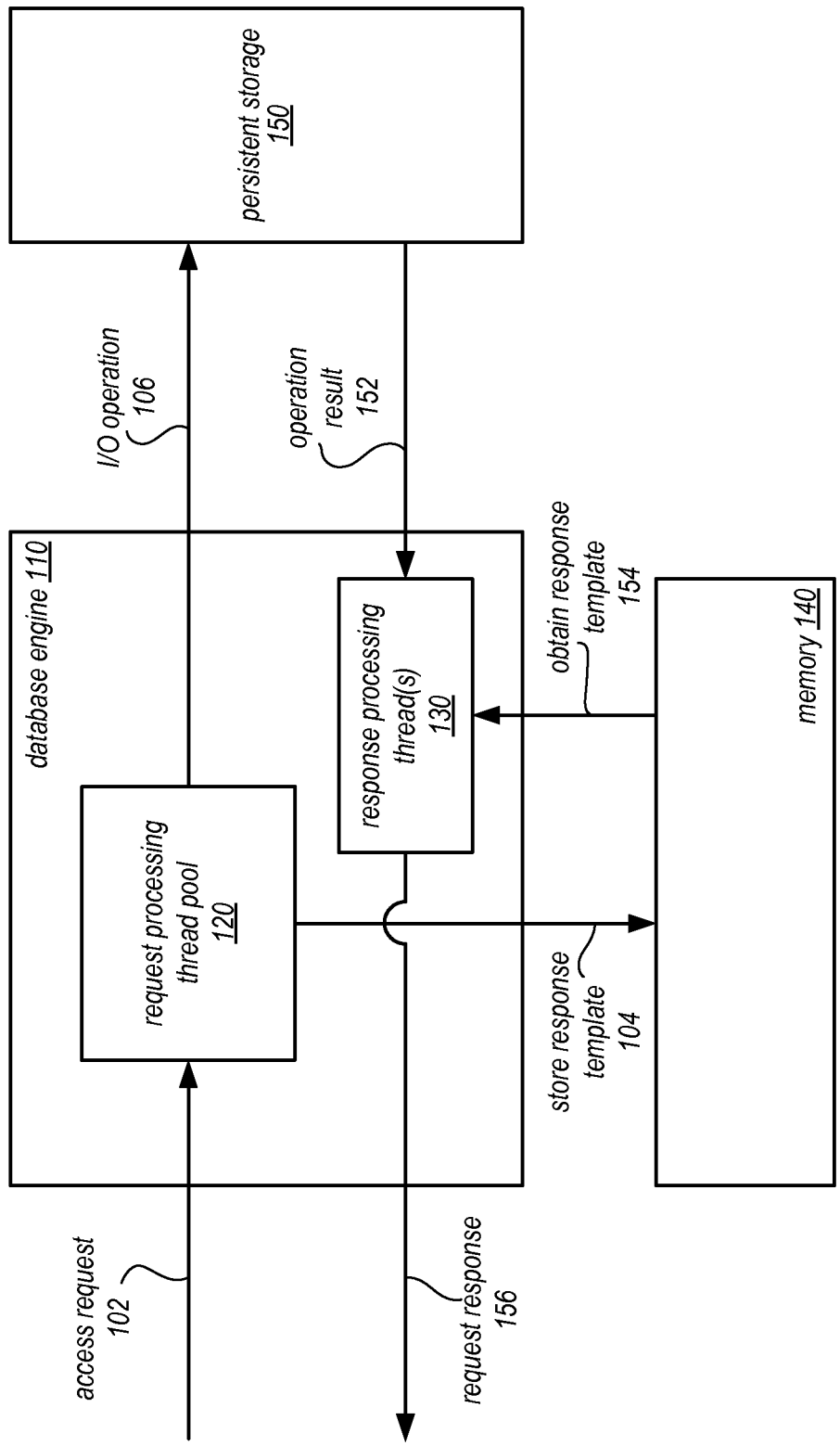
FIG. 1 is a logical block diagram illustrating a database engine that implements asynchronous processing for synchronous requests for a database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of asynchronous processing for synchronous requests in a database are disclosed herein. Database access requests may invoke the performance of different operations in order to be processed. For instance, certain read requests (which may be included as part of a larger "SELECT" statement), may involve reading data that is stored in quickly accessible system memory. Thus, processing operations to service such a read request may be performed and then a response sent with little delay. However, for some types of access requests, such as those requests which require access to a persistent storage device in order to provide a response to the access request (e.g., a commit request), processing of the access request may stall or wait until the persistent storage is accessed. Such access requests may be considered synchronous requests, at least from the perspective of the client or process that submitted the access requests.

Generally, access request processing for databases has been handled at database engines in synchronous fashion (similar to the way in which end users, such as database clients, handle access requests). For example, request processing threads implemented by a database engine to process access requests may acquire or take ownership of a request to process, and continue to process the same request until a response is sent. For those requests that are dependent upon a persistent storage device causing the access request to enter a wait state, the request processing thread may be suspended or "put to sleep" until the persistent storage access is complete. However, as other access requests are received, new threads may have to be created to process the new access requests. Overtime, the number requests processing access requests may grow large (e.g., thousands of request processing threads). Large numbers of request processing threads are not without cost. Operating systems and underlying hardware may have to maintain information about the various threads to waken, schedule, and share system resources. As the number of threads grows, so too the cost of maintaining the threads grows, increasing the processing time for access requests.

In various embodiments, a database system may implement asynchronous processing for access requests that are synchronous (from the perspective of the submitting process/client), and which may be stalled waiting on access to persistent storage. FIG. 1 is a logical block diagram illustrating a database engine that implements asynchronous processing for synchronous requests for a database, according to some embodiments. Database engine 110 may operate or manage a database, in various embodiments. Database engine 110 may be implemented as a combination of hardware and/or software components. As illustrated in FIG. 1, database engine 110 may implement a request processing thread pool 120. Request processing thread pool 120 may include a number of threads dedicated to processing access requests 102. The number of request processing threads in request processing thread pool 120 may be maintained according to a fixed thread pool size. In a least some embodiments, the fixed thread pool size may be set to a number of threads dependent upon a number of processors and/or processor cores that implement the database engine (e.g., 1 thread per core or 2 threads per core). By maintaining a number of request processing threads according to a fixed thread pool size, the costs of implementing large numbers of threads to process access requests may be significantly reduced. However, in order for the smaller number of request processing threads to handle large numbers of access requests (without blocking incoming requests due to a lack of threads to process the request), database engine 110 may provide asynchronous processing, implementing one or more response processing thread(s) 130 (which are different than request processing threads in thread pool 120) to process responses to access requests which may have entered a wait state.

For example, access requests 102 may be received at database engine 110. As noted earlier, some of these access requests may be processed without dependence on a persistent storage I/O operation. Thus, a request processing thread from request processing thread pool 120 may acquire the request, perform different processing operations to accomplish the request, and provide a response (not illustrated). However, as also discussed above, some access requests 102 for a database, such as completing database transactions by submitting a commit request, may depend upon a persistent storage input/output (I/O) operation to complete processing and/or respond to the request. Thus, a request processing thread of request processing thread pool may acquire the request for processing and perform processing operations such that the persistent storage I/O operation 106 is completed. For example, the request processing thread may generate, construct, or place a request in queue to perform a write or read to persistent storage 150. Please note persistent storage 150 may be any type of persistent storage device, whether networked or local. Persistent storage 150 may be accessed via standard storage I/O protocols, such as small computer system interface (SCSI) or internet small computer system interface (iSCSI). In some embodiments, persistent storage 150 may be implemented as part of a separate distributed storage system 150, which may implement various APIs or other interfaces to provide access to data maintained for the database.

The request processing thread may perform other request processing operations as part of servicing the access request. For example, the request processing thread may access (e.g., write to or read from) a data page or buffer cache in memory (e.g. to change data blocks or pages). In at least some embodiments, the request processing thread may store in memory 140 (which may be like system memory 2020 in FIG. 12) state or other information about the access request 102 such that proper response 156 may be sent back (e.g., to a client or requesting process). The stored information may include, for example, the client or socket on which the request was received, information to determine upon what conditions a response is sent back (e.g., successful completion of a write or read data is obtained), or any other information to provide a response. In at least some embodiments, a response template 104 may be stored, as illustrated in 104. The response template may provide a pre-formatted or pre-generated response message that may be read and sent back.

Once the request processing operations are complete, the request processing thread may return to the pool of available request processing threads to process another access request 102. A response processing thread 130 may detect/receive an indication of the I/O operation result 152. For example, the successful acknowledgment of a write from persistent storage 150 may be provided to response processing thread 130 (e.g., the write of one or more log records to a redo log committing a database transaction). In at least some embodiments, response processing thread(s) 130 may access the memory 140 to obtain the response template 154. Response processing thread(s) 130 may modify or prepare the response and send the request response 156 back to the submitting client or process. Meanwhile, the request processing thread that processed the access request initially, may be available to or processing other access requests 102.

Figure 11:
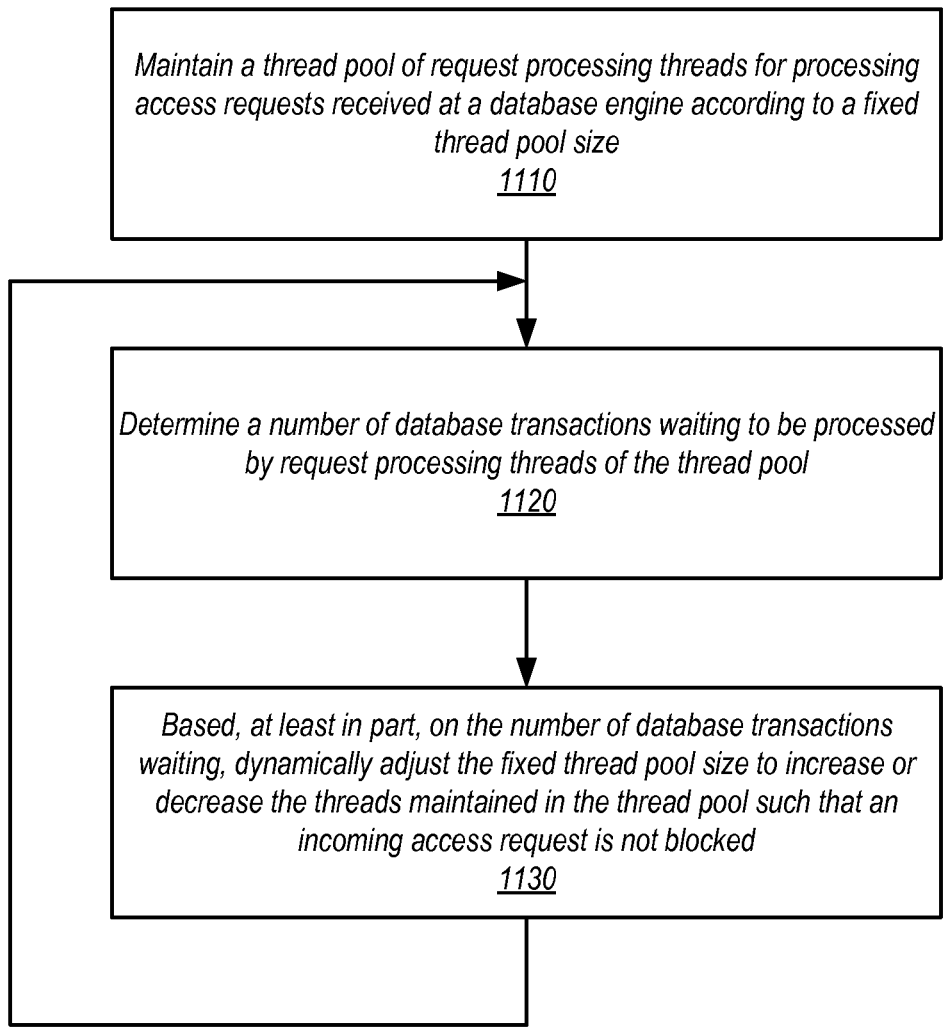
FIG. 11 is a high-level flowchart illustrating techniques for adjusting the size of the thread pool of request processing threads at a database engine, according to some embodiments.

While limiting the number of request processing threads according to a fixed size for request processing thread pool 120 may prove optimal in many cases, there are some scenarios where some adjustments may need to be made to the number of threads in request processing thread pool 120 so that database engine 110 does not enter a locked or frozen state. For example, if a number of database transactions are waiting upon another database transaction which has locked or blocked access to a desired portion of data maintained for the database, the request processing threads of thread pool 120 may all become unavailable, attempting to process requests for the blocked database transactions. In at least some embodiments, the fixed size of request processing thread pool 120 may be dynamically adjusted to increase the number of threads (so that a commit request for a database transaction blocked by other requests may be received and processed, allowing other requests for the other database transactions to make progress). Similarly, the fixed thread pool size may be decreased to return an optimal number of request processing threads if the number of waiting database transactions is lower. FIG. 11, discussed below, describes in more detail examples of dynamically adjusting the fixed thread pool size for request processing pools.

Although various embodiments of asynchronous processing for synchronous requests may be implemented in many different database systems, the specification first describes an example network-based database service configured to implement processing for synchronous requests. Included in the description of the example network-based database service are various aspects of the example network-based database service, such as a database engine and a separate distributed database storage service. In some embodiments, leveraging the distributed storage system may increase the number of requests that are processed synchronously. The specification then describes a flowchart of various embodiments of methods for asynchronous processing of synchronous requests at databases. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (or more specifically, the database engine head node) may include a cache (which may be referred to as a data page cache or buffer cache) in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume. For example, in some embodiments, in response to a request to make a change to a database, the client-side driver may be configured to determine the protection group, and its one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

Figure 2:
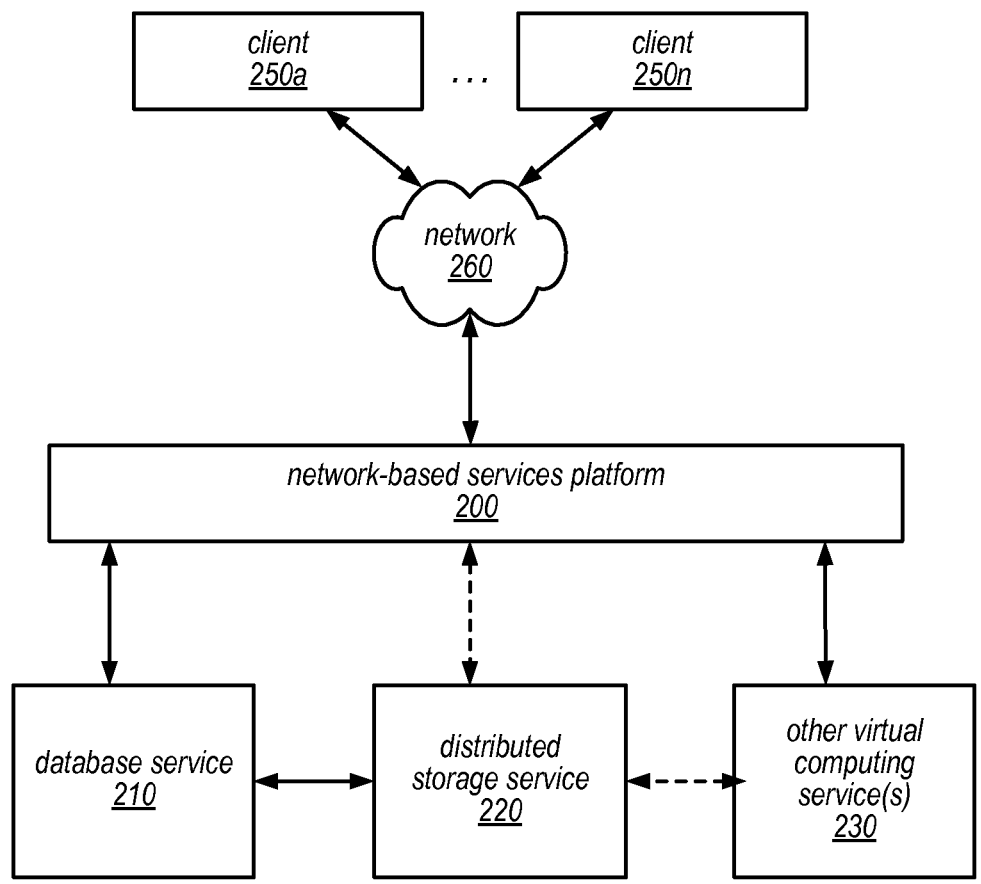
FIG. 2 is a block diagram illustrating a service system architecture that may be configured to implement a network-based database service, according to some embodiments.

One embodiment of a service system architecture that may be configured to implement a network-based database service is illustrated in FIG. 2. In the illustrated embodiment, a number of clients (shown as clients 250*a*-250*n*) may be configured to interact with a network-based services platform 200 via a network 260. Network-based services platform 200 may be configured to interface with one or more instances of a database service 210, a distributed storage service 220 and/or one or more other virtual computing services 230. Distributed storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 2000 embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., user access requests to query for data, commit transactions, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
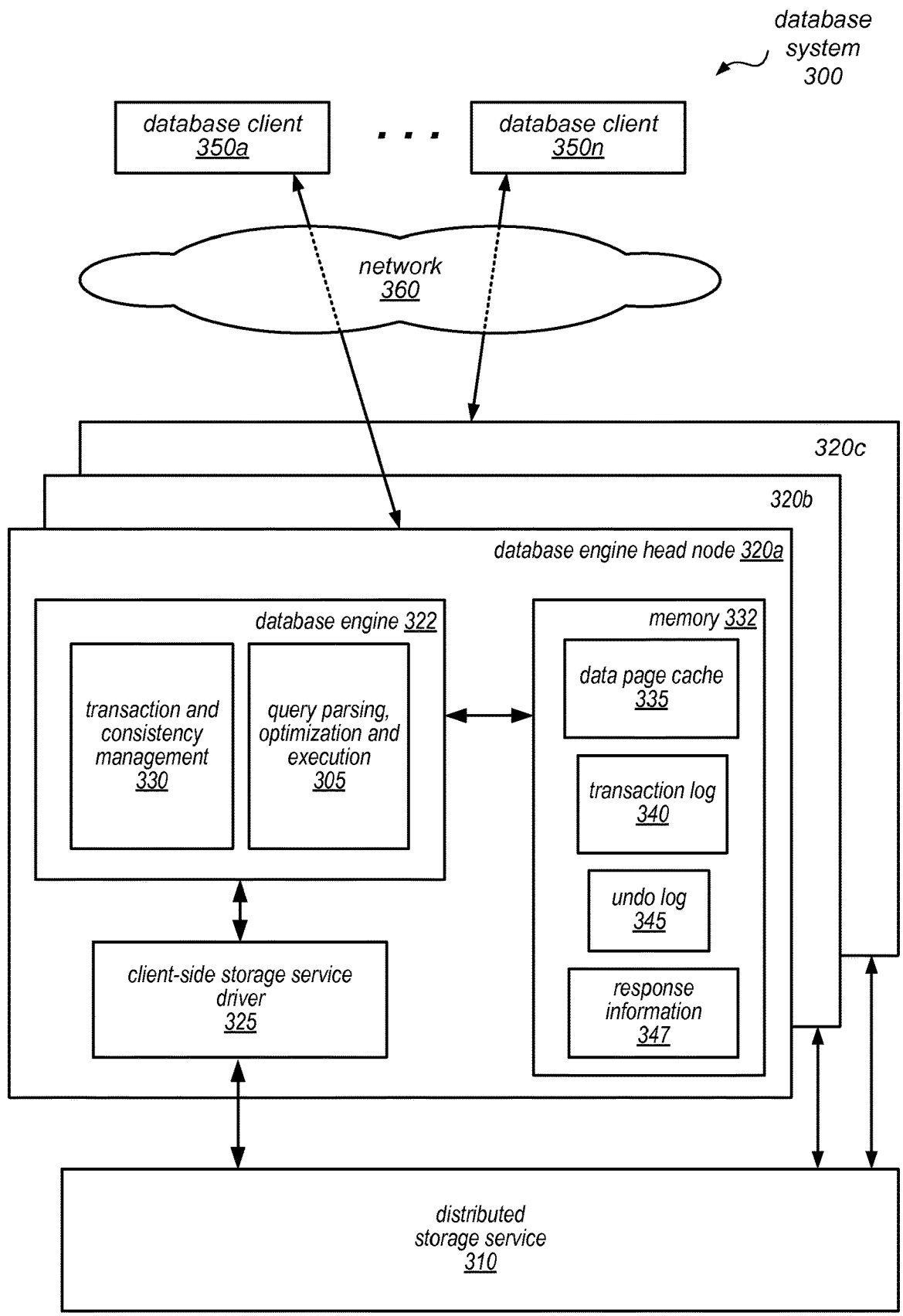
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to some embodiments. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed storage service 310, which may be employed by the database system to store data pages of one or more databases (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, log record manipulation, and/or space management operations in a manner that is invisible to storage clients 350a-350n. Distributed storage service 310 may, in some embodiments, be configured to maintain a consistent state of databases for which the service stores data.

As previously noted, each database instance may include a single database engine head node 320 that receives requests (e.g., queries, transactions, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. For example, in various embodiments, query parsing optimization and execution module 305 may implement the various techniques described above with regard to FIG. 1 to provide asynchronous processing from some access requests. Consider the scenario where some requests received from database clients 350 may be dependent upon access to data pages or other data stored in distributed storage service 310. Query parsing, optimization, and execution component 305 may implement a pool of request processing threads, which may be maintained according to a fixed thread pool size, to process these access requests. Upon completion of processing operations such that the request to distributed storage service 310 is performed (e.g., sending a request to client-side storage service driver 325 to access the data or grouping the request with other requests so that the access performed by client-side storage service driver 325 is performed as a group), the request processing thread may be made available to process other access requests (while the various messages are sent to and from client-side storage service driver 325). One or more response processing threads may be implemented by query parsing, optimization, and execution component 305 to provide responses to access requests. For example, response processing threads may receive indications of the completion of write requests for redo log records written to a redo log maintained in distributed storage service 310 from client-side storage service driver 325, and based on the received indications/data provide a response. More generally, database engine 322 may implement various ones of the techniques described below in FIGS. 8A-11.

As illustrated in this example, database engine head node 320a may also include a client-side storage service driver 325, which may route read requests and/or redo log records to various storage nodes within distributed storage service 310, receive write acknowledgements from distributed storage service 310, receive requested data pages from distributed database-optimized storage service 310, and/or return data pages, error messages, or other responses to query parsing, optimization, and execution component 305 (which may, in turn, return them to database client 350a).

In this example, database engine head node 320a includes a data page cache 335 (sometimes referred to as a buffer cache), in which data pages that were recently accessed may be temporarily held, such as also described above with regard FIG. 1. Request processing threads, as described above, may perform various operations to write to and/or read from the data page cache (as well as transaction log and/or undo log) as part of processing an access request from a database client 350. In some embodiments, request processing threads may store response information 347 in memory 332 so that indicates when and how to provide responses to access requests. For example, response templates may be stored in memory 332 as part of response information 347, which may be later access and used by response processing threads to send back responses to clients 350 for access requests.

As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit. Although illustrated as included in memory 332, transaction log 340 and undo log 345 may, in some embodiments, be maintained in separate portions or devices of memory than data page cache 335.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed database-optimized storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
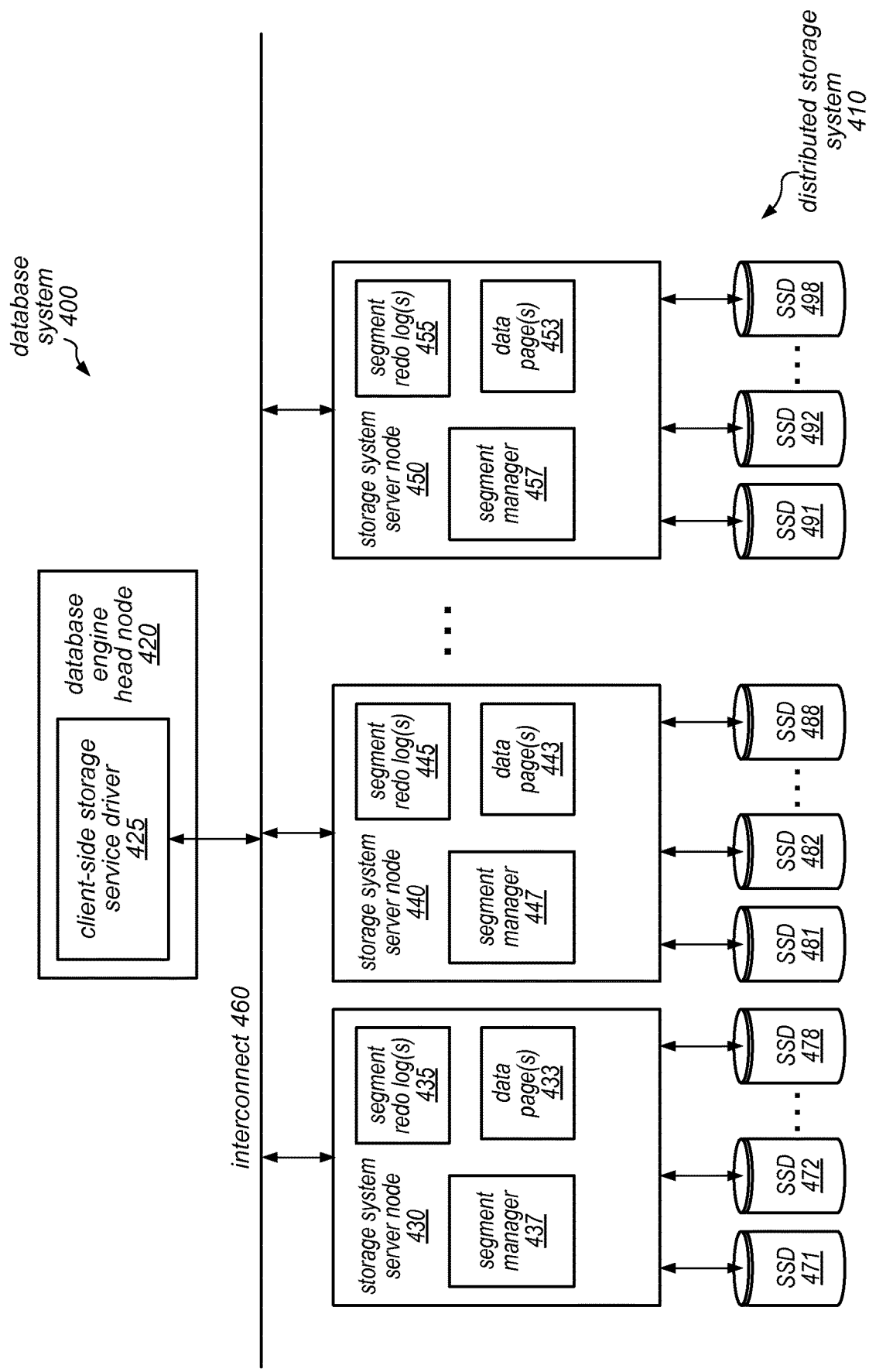
FIG. 4 is a block diagram illustrating various components of a distributed storage system, according to some embodiments.

One embodiment of a distributed storage system is illustrated by the block diagram in FIG. 4. In at least some embodiments, storage nodes 430-450 may store data for different clients as part of a multi-tenant storage service. For example, the various segments discussed above and below with regard to FIG. 7, may correspond to different protection groups and volumes for different clients.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Distributed storage system 410 may also implement a storage control plane. Storage control plane may be one or more compute nodes configured to perform a variety of different storage system management functions. For example, storage control plane may implement a volume manager, which may be configured to maintain mapping information or other metadata for a volume, such as current volume state, current writer, truncation tables or other truncation information, or any other information for a volume as it is persisted in varying different, extents, segments, and protection groups. The volume manager may be configured to communicate with a client of storage system 410, such as client-side driver 425 in order to "mount" or "open" the volume for the client, providing client-side driver 425 with mapping information, protection group policies, and various other information necessary to send write and read requests to storage nodes 430-450. The volume manager may be configured to provide the maintained information to storage clients, such as database engine head node 420 or client-side driver 425 or to other system components such as recovery service agents 418. For example, the volume manager may provide a current volume state (e.g., clean or dirty), current epoch indicator and/or any other information about the data volume.

Figure 5:
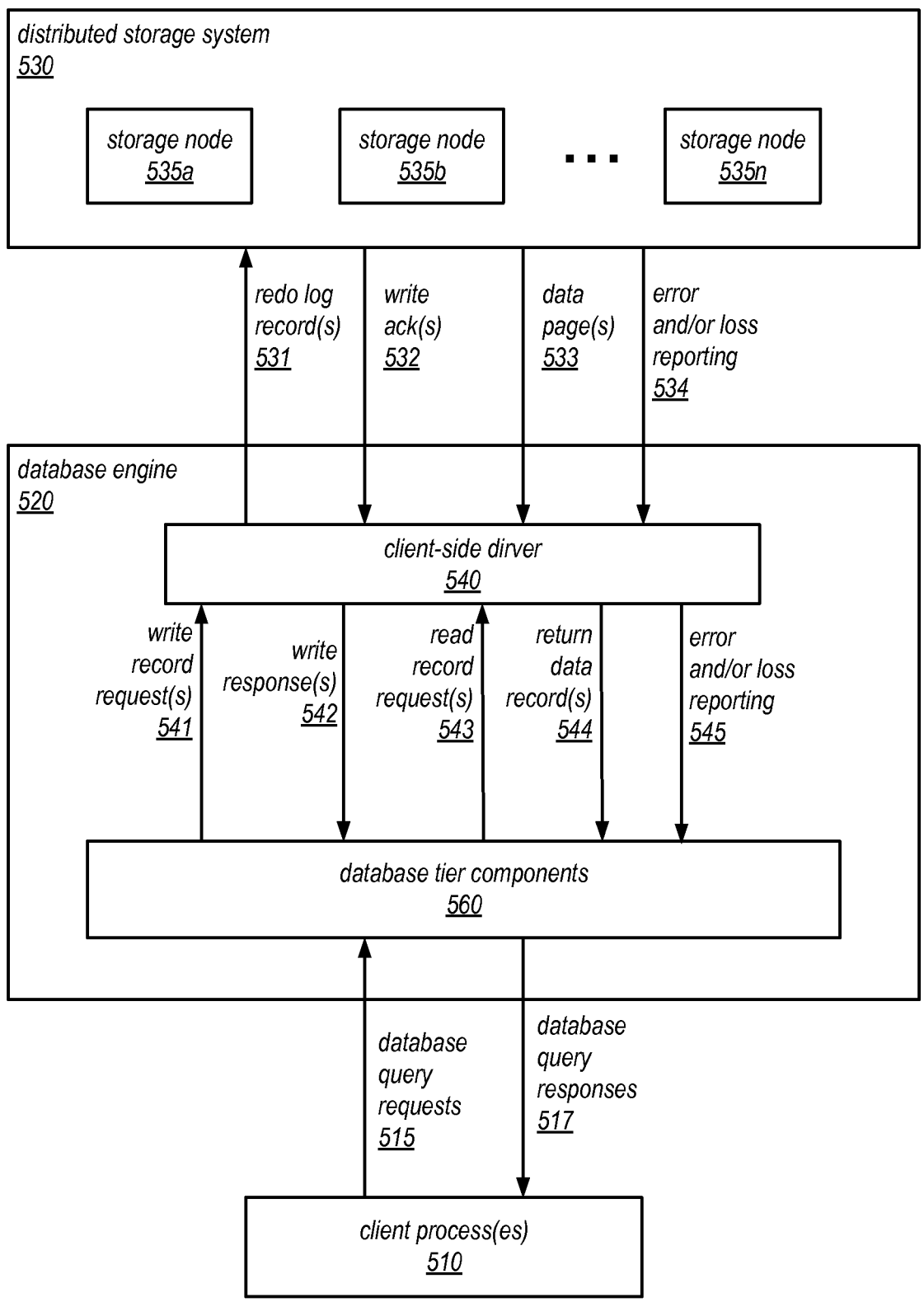
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3). In various embodiments, database engine 520 may have obtained a volume epoch indicator or other identifier from distributed storage system 530 granting access writes to a particular data volume, such as by sending a request to open the data volume to distributed storage system 530.

In this example, one or more client processes 510 may send database query requests 515 (which may include read (e.g., "SELECT" requests) and/or write requests (e.g., "UPDATE," "INSERT," or "DELETE") targeting data stored on one or more of the storage nodes 535a-535n or other requests such as "COMMIT" requests to commit database transactions) to database tier components 560, and may receive database query responses 517 from database tier components 560 (e.g., responses that include write acknowledgements and/or requested data, which if dependent upon accessing distributed storage system 530 to provide the response may be processed asynchronously as described above). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in distributed storage system 530. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with system components.

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
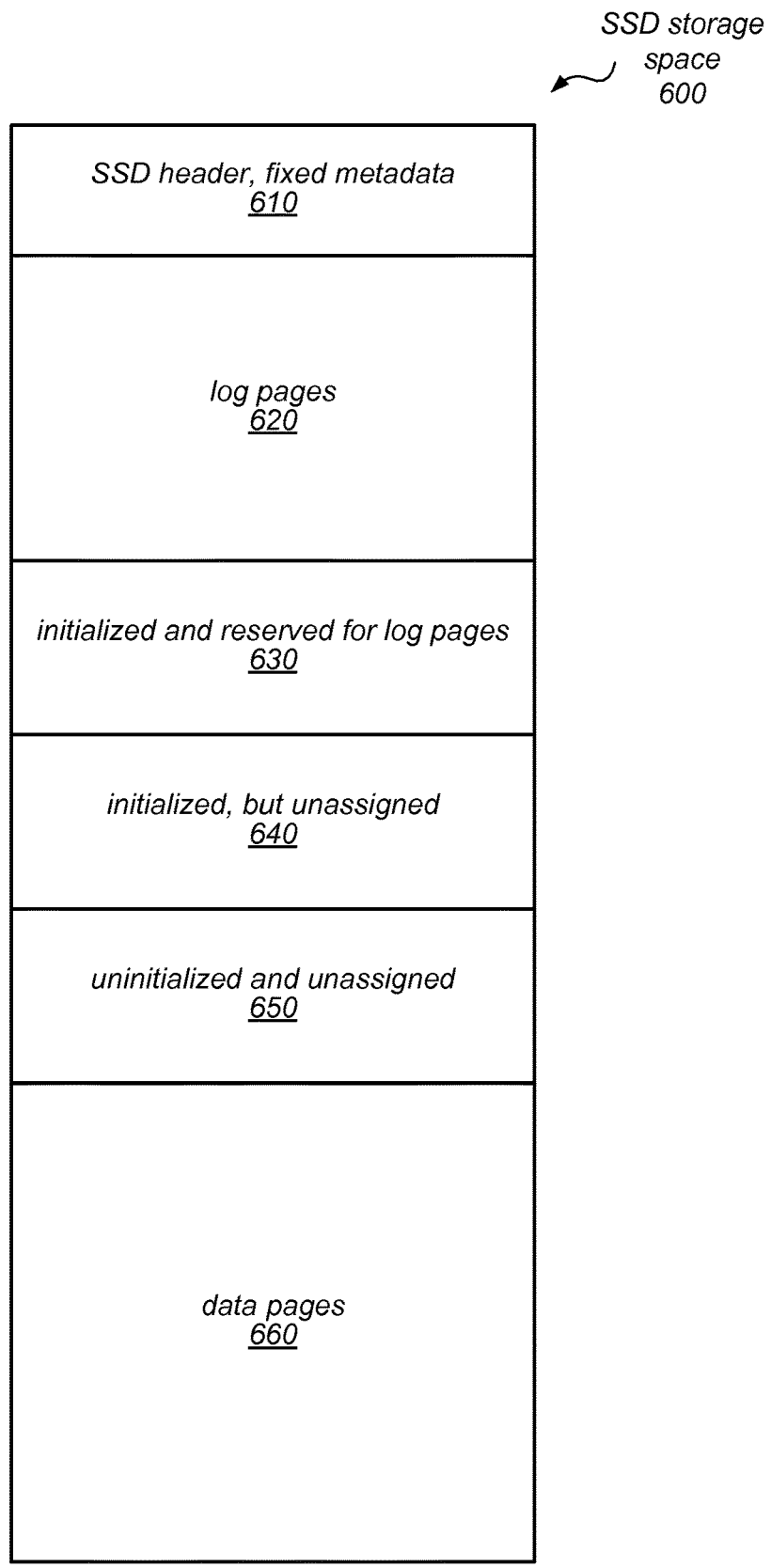
FIG. 6 is a block diagram illustrating how data and metadata may be stored on a storage node of a distributed storage system, according to some embodiments.

FIG. 6 is a block diagram illustrating how data and metadata may be stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of a storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a data volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments (i.e. group members) for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

Figure 7:
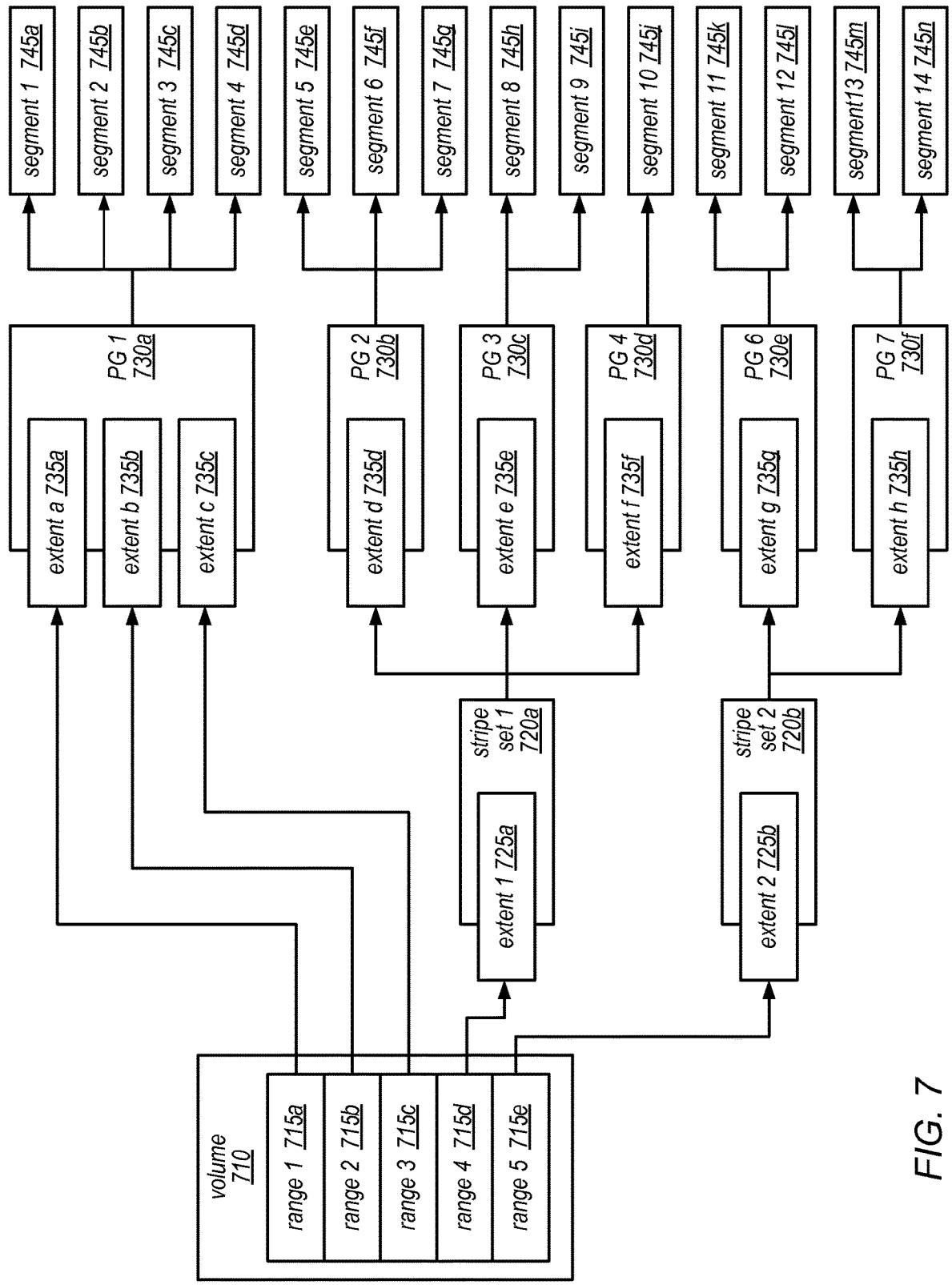
FIG. 7 is a block diagram illustrating an example configuration of a data volume, according to some embodiments.

FIG. 7 is a block diagram illustrating an example configuration of a database volume 710, according to one embodiment. In this example, data corresponding to each of various address ranges 715 (shown as address ranges 715a-715e) is stored as different segments 745 (shown as segments 745a-745n). More specifically, data corresponding to each of various address ranges 715 may be organized into different extents (shown as extents 725a-725b, and extents 735a-735h), and various ones of these extents may be included in different protection groups 730 (shown as 730a-730f), with or without striping (such as that shown as stripe set 720a and stripe set 720b). In this example, protection group 1 illustrates the use of erasure coding. In this example, protection groups 2 and 3 and protection groups 6 and 9 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (720a) and stripe set 2 (720b) illustrates how extents (e.g., extents 725a and 725b) may be striped into a volume, in some embodiments.

More specifically, in this example, protection group 1 (730a) includes extents a-c (735a-735c), which include data from ranges 1-3 (715a-715c), respectively, and these extents are mapped to segments 1-4 (745a-745d). Protection group 2 (730b) includes extent d (735d), which includes data striped from range 4 (715d), and this extent is mapped to segments 5-7 (745e-745g). Similarly, protection group 3 (730c) includes extent e (735e), which includes data striped from range 4 (715d), and is mapped to segments 8-9 (745h-745i); and protection group 4 (730d) includes extent f (735f), which includes data striped from range 4 (715d), and is mapped to segment 10 (745j). In this example, protection group 6 (730e) includes extent g (735g), which includes data striped from range 5 (915e), and is mapped to segments 11-12 (945k-945l); and protection group 7 (730f) includes extent h (735h), which also includes data striped from range 5 (715e), and is mapped to segments 13-14 (745m-745n).

Please note that the striping, erasure coding, and other storage schemes for the database volume apply to the user data space of the database volume, not the log records pertaining to the volume. Log records are segmented across protection groups according to the partition of the volume maintained at the protection group. For example, log records indicating updates to the user data striped from range 5 maintained in PG 6, pertain to the user data in PG 6.

Figure 8A:
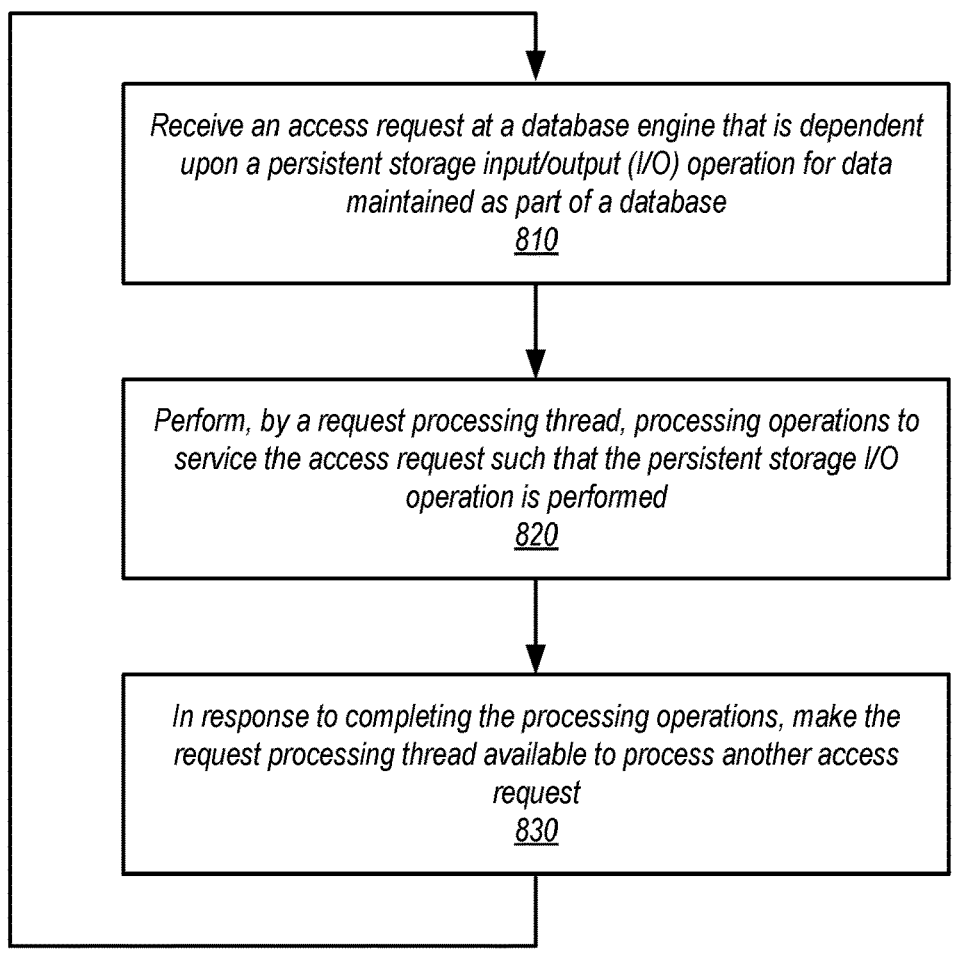
FIG. 8A is a high-level flowchart illustrating techniques for asynchronously processing access requests by a request processing thread of a database engine, according to some embodiments.
Figure 8B:
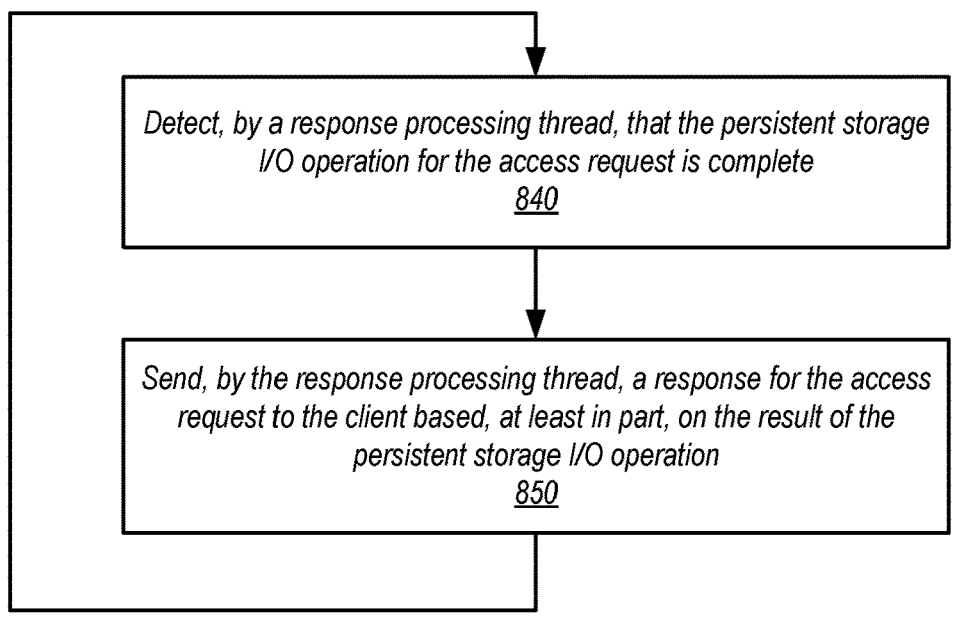
FIG. 8B is a high-level flowchart illustrating techniques for asynchronously processing access requests by a response processing thread of a database engine, according to some embodiments.

The distributed storage service and database service discussed in FIGS. 2 through 7 provide examples of a database system that may implement asynchronous processing for synchronous requests. However, various other types of database systems may be implemented, which may not utilize a separate storage system. For example, a database system may utilize a local or remote storage drive access via a standard storage interface, such as small computer system interface (SCSI) or internet small computer system interface (iSCSI). The database and/or database engine may be differently configured and may or may not implement various components, such as a data page cache or undo logging. FIGS. 8A and 8B are high-level flowcharts illustrating techniques for asynchronous processing of access requests at a database, according to some embodiments. Various ones of the database systems described above, as well as many other types of database engines, may implement the techniques described below with regard to FIGS. 8A-11.

FIG. 8A is a high-level flowchart illustrating techniques for asynchronously processing access requests by a request processing thread of a database engine, according to some embodiments. As indicated at 810, an access requests may be received at a database engine that is dependent upon a persistent storage input/output (I/O) operation for data maintained as part of a database, in some embodiments. Access requests may be of many different types and formatted in different ways. For example, access requests may be formatted according to a particular language (such as structured query language (SQL), or an API). Access requests may include requests such as insertions, updates, deletions, selections, or commits for database transactions. In some embodiments, processing of the access request from the perspective of the client/process that submits the access request is performed synchronously (e.g., the client/process cannot make further progress until the response for request is received back). However, different ones of these types of access requests may be dependent upon a persistent storage I/O operation such that processing of the request at the database engine enters a wait state, which may last at least until the persistent storage I/O operation is complete (and possibly longer if further processing or I/O operations are necessary). For instance, data pages, blocks, records or other database information may need to be written to, modified, changed, created, or read from in order to service the access request. Which types of access requests dependent upon persistent storage I/O operations before responding may differ depending on the implementation of the database. For example, in a distributed database system such as described above with regard to FIGS. 2-7, certain insertions, updates, or deletions may be performed asynchronously (e.g., by sending redo log records to the distributed storage system for persistent storage), acknowledging the requests without waiting on a response from the distributed storage system. For other requests, such as commits or requests that require reading data from the distributed storage system, a response may have to wait until a response from the distributed storage system is provided. As I/O operations for persistent storage devices may involve a wait time (especially when compared with faster I/O technologies such as system memory), processing of the access request may be unable to complete (or be responded to) until the I/O operation is complete. Instead of treating those "synchronous access requests" in a synchronous manner at the distributed storage system, asynchronous processing may be implemented.

A request processing thread, which may be a thread of request processing thread pool (as discussed above with regard to FIG. 1) may acquire the request. For example, the request processing thread may implement a technique to listen for incoming access requests on different connection sockets (e.g., performing an "epoll" or other event notification mechanism), and assume processing responsibility for the access request. In some embodiments, different pools of threads may be maintained for listening to different sockets, while in other embodiments a single pool of request processing threads may be implemented for listening across all sockets. The number of threads in the request processing thread pool may be maintained according to a fixed size for the thread pool, which may limit the number of access requests that can be processed to the number of request processing threads in the request processing thread pool. As discussed below, with regard to FIG. 11, the fixed size of the request processing thread pool may be dynamically adjusted such that at least one thread is available to process a subsequent access request. However, in various embodiments a default or optimal size may be enforced (unless circumstances dictate an adjustment as in FIG. 11) to keep the number of request processing threads in the request processing thread pool consistent. In this way, the burden of context switching between a large number of threads may be significantly reduced, providing for decreased request processing latency and increased request processing throughput.

As indicated at 820, the request processing thread for the access request may perform one or more processing operations to service the access request such that the persistent storage I/O operation is performed. Processing operations may include performing the various operations to handle the request prior to and/or in order to trigger/cause the performance of the persistent storage I/O operation upon which the access request depends. For example, as illustrated below in FIG. 10A, the request processing thread servicing a read request may first check whether requested data may be found in an data page cache (also referred to as in-memory buffer cache), bypassing the need to perform a persistent storage I/O operation. In some embodiments, processing operations may include constructing and/or sending a persistent storage I/O request, while in other embodiments, the request processing thread may perform a processing operation to place the request in a queue to be sent (e.g., a group commit technique) to persistent storage.

In at least some embodiments, one of the request processing operations may include storing state or response information describing when and how to respond to the access request and/or continue processing the access request. The state information or other metadata may be stored in system memory, such as memory 2020 described below in FIG. 12. The state information may include information to recognize when to send back a response (e.g., what response or information is needed back from persistent storage to determine the operation completed successfully) and/or information to determine how the response is to be sent (e.g., identifiers for the client, the socket, the type of access request, etc. . . . ). In at least some embodiments, a template response may be stored. The template response may or may not require further modification before being sent back to the client.

In response to completing the performance of the processing operations, the request processing thread may be made available to process other access requests, as indicated at 830, in various embodiments. For example, the request processing thread may begin polling or listening across sockets to acquire another incoming access request. In this way, some request processing threads may complete processing of other access requests (repeating elements 810, 820 and 830), until before a response is sent or a persistent storage I/O operation is complete for a previously received access request processed by that same request processing thread. Thus, the processing of access requests may be divided and performed between a request processing thread and a response processing thread, allowing other access requests to be serviced without increasing the number of request processing threads at database engine (which may be maintained at an optimal number as noted above).

FIG. 8B is a high-level flowchart illustrating techniques for asynchronously processing access requests by a response processing thread of a database engine, according to some embodiments. A response processing thread may be a different thread than the request processing thread. In various embodiments, the response processing thread may be a single, dedicated thread for processing responses to access requests at the database engine. In some embodiments, the response processing thread may be one of multiple response processing threads for processing responses. As indicated at 840, the response processing thread may detect that the persistent storage I/O operation for the access thread is complete, in some embodiments. For example, as discussed above with regard to FIGS. 2-7, the storage system may be distributed and various quorum or other replication schemes may be implemented to determine when changes are made to data stored for the database (or when a consistent view of data is read). In some embodiments, a client-side driver, such as client-side driver 540 in FIG. 5, may be implemented that sends requests to and receives acknowledgments from storage nodes in a distributed storage system, and may report storage responses (e.g., acknowledgements, data pages read from the storage system, etc.). For example, the storage system response may be reported as durable log sequence numbers (LSNs), in some embodiments. The response processing thread may access state or response information, such as discussed above with regard to element 820, to determine whether the received durable LSN is greater than an LSN associated with the access request. If the LSN is greater than the LSN associated with the access request, the response processing thread may determine that the storage I/O operation for the access request is complete at the distributed storage system.

As indicated at 850, the response processing thread may then send a response for the access request to the client based, at least in part, on the result of the persistent storage I/O operation. The response processing thread may, in various embodiments, construct the response message based on state or other information stored in memory by the request process thread, as noted above. For example, the state information may include the socket, client, transaction identifier, and/or any other information for constructing a proper response. In some embodiments, the state information may include a response template, which may be modified according to the result of the persistent storage I/O operation (e.g., changed to an error if an error is reported). The modified (or unmodified) response template may then be sent to the client. Note that for some of the access requests discussed above, the response to the client may include additional processing. Requests that identify multiple data records (e.g., responses to queries involving "SELECT" statements), for instance, may involve waiting for data from additional read requests sent to persistent storage, which may then be evaluated and included (or excluded) from responses sent to a client. Thus, in some embodiments (similar to example of group commit discussed below with regard to FIGS. 9A-9B) the response sent by the response processing thread may be queued until data from other read requests is received and processed.

Figure 9A:
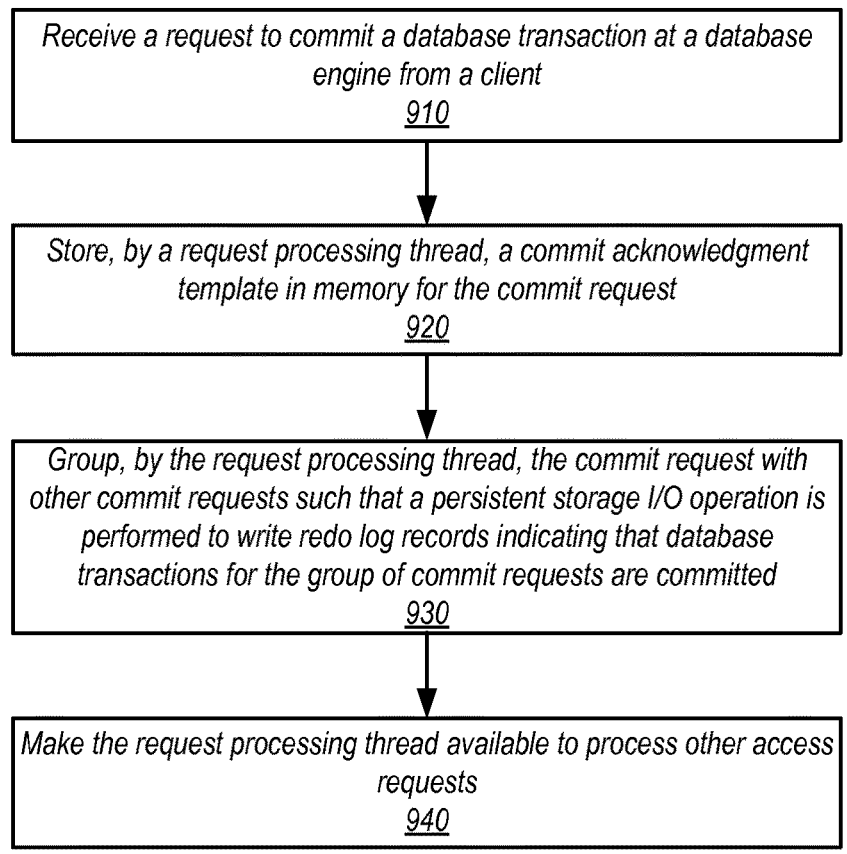
FIG. 9A is a high-level flowchart illustrating techniques for asynchronously processing a commit request by a request processing thread of a database engine, according to some embodiments.

One example of asynchronously processing an access request dependent upon a persistent storage I/O operation is a commit request, which may be implemented by writing or recording as permanent the effects of a database transaction. FIG. 9A is a high-level flowchart illustrating techniques for asynchronously processing a commit request by a request processing thread of a database engine, according to some embodiments. A commit request for a database transaction may be received at a database engine from a client, as indicated at 910. A request processing thread may acquire the commit request for processing. As discussed above with regard to FIGS. 8A and 8B, the request processing thread may store a commit acknowledgment template (or other information in order send a response) in memory, such as system memory 2020 discussed below with regard to FIG. 12. In at least some embodiments, group commit processing may be implemented. For example, as indicated at 930, the request processing thread may group the commit request with other commit requests such that a persistent storage operation I/O is performed to write redo log records indicating that database transactions for the group of commit requests are committed. A queue or other structure may be implemented, for instance, to store the group of commit requests, for which a later request processing thread may send the corresponding redo log records indicating the committed database transactions. In some embodiments, group commit processing may not be implemented (or enabled), and thus the request processing thread may send the request to write a corresponding redo log record(s) for the commit request. As indicated at 940, upon completing the grouping of the commit request and/or the sending of the commit request, the request processing thread may be made available to process other access requests.

Figure 9B:
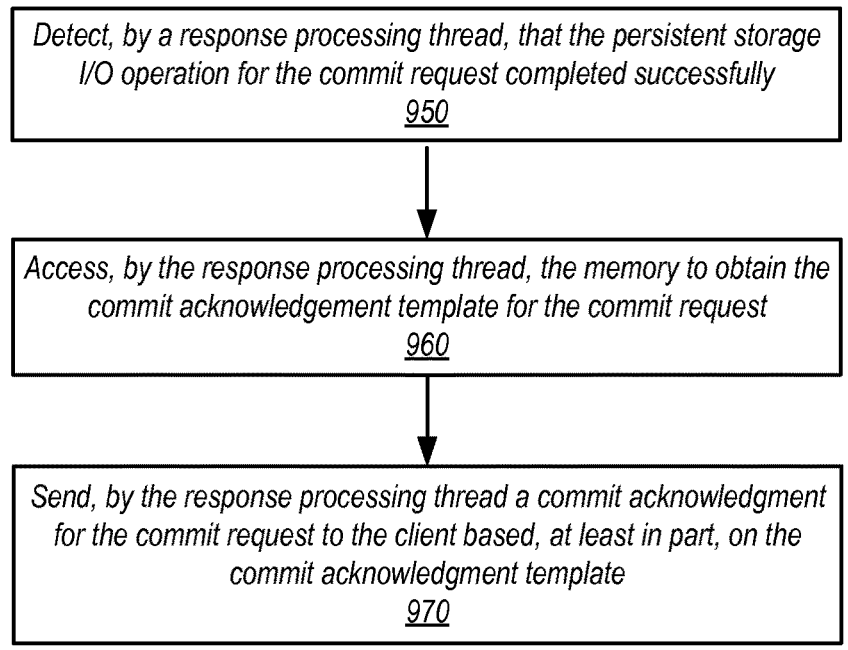
FIG. 9B is a high-level flowchart illustrating techniques for asynchronously processing a commit request by a response processing thread of a database engine, according to some embodiments.

FIG. 9B is a high-level flowchart illustrating techniques for asynchronously processing a commit request by a response processing thread of a database engine, according to some embodiments. As indicated at 950, a response processing thread may detect that the persistent storage I/O operation for the commit request completed successfully. For example, an acknowledgment or completion message may be received from persistent storage according to a standard storage interface, such as small computer system interface (SCSI) or internet small computer system interface (iSCSI). In another example, a separate storage system, such as illustrated above in FIGS. 2-6, may be implemented, and acknowledgments received back from multiple storage nodes, which may be evaluated as to whether the number of acknowledgments satisfy a write quorum requirement, in some embodiments. As indicated at 960, the response processing thread may access the memory to obtain the commit acknowledgment template for the commit request. The response processing thread may then send the commit acknowledgment based, at least in part, on the commit acknowledgment template, as indicated at 970. For example, the commit acknowledgment template may have to be modified by the response processing thread prior to sending (e.g., based on the acknowledgment from persistent storage) or may be sent without modification to the client.

Figure 10A:
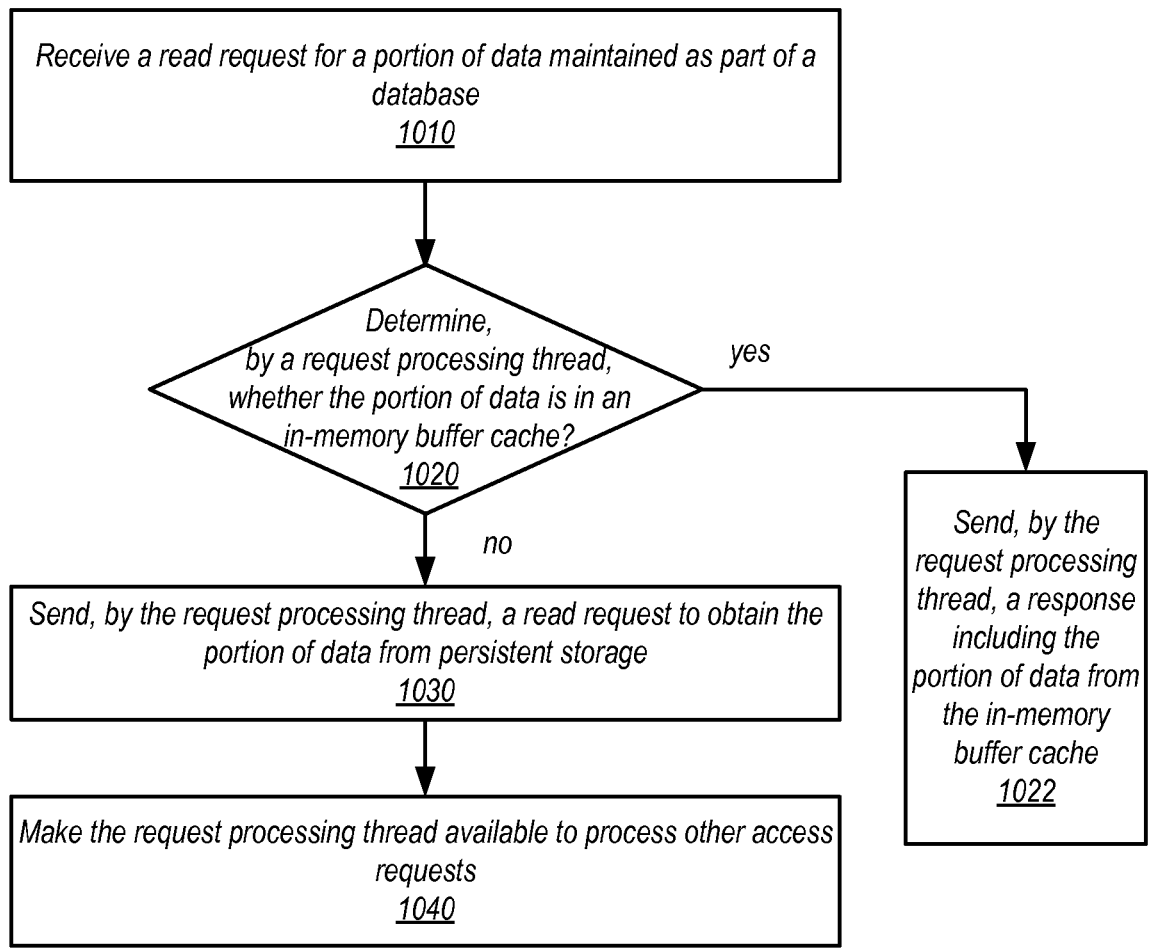
FIG. 10A is a high-level flowchart illustrating techniques for asynchronously processing a read request by a request processing thread of a database engine, according to some embodiments.

Another example of asynchronously processing an access request dependent upon a persistent storage I/O operation is a read request, which may be serviced using data read from a persistent storage device. FIG. 10A is a high-level flowchart illustrating techniques for asynchronously processing a read request by a request processing thread of a database engine, according to some embodiments. As indicated at 1010, a read request may be received for a portion of data maintained as part of a database. The read request may be received, determined, or incorporated as part of a broader database access request. For example, a structured query language (SQL) "SELECT" statement may be included in an access request, requesting the retrieval of data in multiple different rows or columns that may be located in different storage locations (e.g., different data pages or data blocks). Therefore, a particular data page or block may need to be accessed to service the access request including the SELECT statement. A corresponding read request may be generated and received at a database engine that requests access to the particular data page or block to obtain the requested data.

As discussed above with regard to FIGS. 1 and 3, in some embodiments, a database engine may implement a buffer cache for recently accessed data (e.g., recently written to or recently read from). The cache may be located in memory, such as system memory 2020 discussed below with regard to FIG. 12. A request processing thread that acquires the read request for processing may determine whether the requested data is located in the in-memory buffer cache (and thus is not dependent upon a persistent storage I/O operation). If, as indicated by the positive from element 1020, the requested portion of data is located in the in-memory buffer cache, then a response may be sent by the request processing thread including the portion of data read from the in-memory buffer cache, as indicated at 1022. After sending the response, the request processing thread may become available again to process another access request. If the portion of data is not located in the in-memory buffer cache, as indicated by the negative exit from 1020, then the request processing thread may send a read request to obtain the portion of data from persistent storage, as indicated at 1030.

As discussed above with regard to FIGS. 8A-10B, the read request may vary according to the persistent storage indicated. For example, if the persistent storage for the database is a local or network-based storage drive, the read request may be formatted according to a standard storage interface, such as small computer system interface (SCSI) or internet small computer system interface (iSCSI). In some embodiments, as illustrated above in FIG. 4, the read request may be sent to a separate storage system or service, and may be formatted according to an API for the separate storage system or service. As indicated at 1040, once the read request is sent (and any other processing operation such as saving state information or other information to send back a response for the read request as discussed above at element 820 in FIG. 8A), the request processing thread may be made available to process other access requests.

Figure 10B:
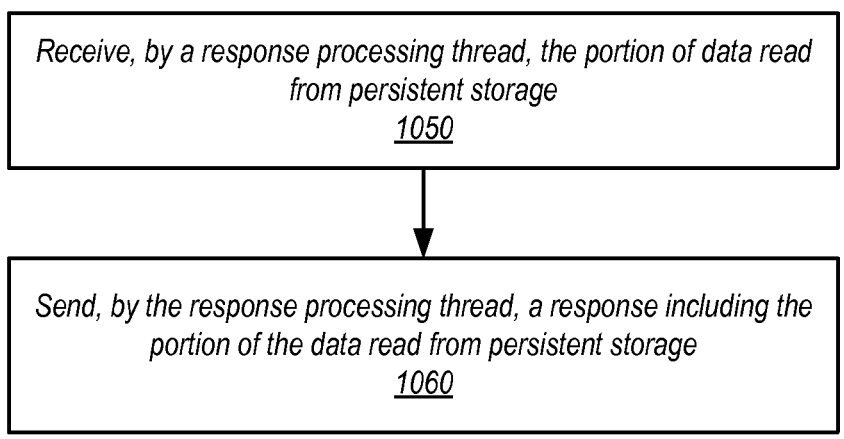
FIG. 10B is a high-level flowchart illustrating techniques for asynchronously processing a read request by a response processing thread of a database engine, according to some embodiments.

FIG. 10B is a high-level flowchart illustrating techniques for asynchronously processing a read request by a response processing thread of a database engine, according to some embodiments. As indicated at 1050, a response processing thread may receive the portion of data read from persistent storage, in various embodiments. In some embodiments, the response processing thread may store a copy of the portion of data in the in-memory buffer cache. As discussed above, with regard to FIGS. 8B and 9B, the response processing thread may generate or access a response message or indication which may include information for sending a response to the read request. Further processing, or re-entering a wait state may occur as a response to the access request may be dependent upon multiple other storage I/O operations. The response may then be sent by the response processing thread including the portion of data read from persistent storage, as indicated at 1060.

Fixed thread pool sizes may ensure that an efficient number of threads are used for processing access requests received at a database engine. For example, the number of request processing threads may correspond to a number of processors or processor cores implemented as part of a system implementing the database engine. Such an implementation may configure the database engine to optimally process access requests, with reduced latency due to processing burdens created by larger numbers of processing threads. As discussed above with regard to FIGS. 1, 8A, 9A, and 10A, request processing threads may asynchronously process access requests, and return to the request processing pool to process another access request when the processing operations are complete, which may cause the access request to enter a wait state. However, in some scenarios, the processing operations may themselves be unable to be completed, for instance as a result of maintaining ACID compliance for the database, which may instigate a live lock or similar situation which prevents new access requests from being processed as no more request processing threads in the request processing thread pool are available.

Consider a scenario where access requests implementing a database transaction are received at a database engine. If these access requests are modifying or accessing certain data in the database, other access to the data may be blocked (e.g., rows containing the data may be locked). If subsequently received access requests that are not a part of the same database transaction and access the same data are also received, then these requests may be acquired by a request processing thread, but have to wait before processing operations can be performed. If enough requests are received such that the remaining request processing threads in the pool are taken so that no thread remains to process a request that commits the original database transaction (freeing up the other requests to begin processing), then the database engine may be unable to continue processing received access requests. Thus, in some instances, it may be optimal to adjust the fixed thread pool size of request processing threads to ensure that request processing threads are available to handle commit requests for outstanding database transactions (or other requests that allow the database engine to make progress).

FIG. 11 is a high-level flowchart illustrating techniques for adjusting the size of the thread pool of request processing threads at a database engine, according to some embodiments. As indicated at 1110 a thread pool of request processing threads for processing access requests received at a database may be maintained according to a fixed thread pool size, in some embodiments. A thread pool manager or other database engine components may implement the various commands to create or abort threads in order to maintain request processing threads according to the fixed size for the request processing thread pool. In at least some embodiments, the fixed thread pool size may be initially or by default set to a size that is equivalent to the number of processors or processing cores implementing the database engine (or a multiple thereof, such as 2 threads for every processor/processing core).

In various embodiments, database transactions received at database engine may be tracked or monitored. For example, a transaction table or other data structure or set of metadata describing received database transactions may be maintained, indicating whether database transactions are waiting or acknowledged as complete. Part of monitoring the database transactions may include determining the number of database transactions waiting to be processed by request processing threads of the request processing thread pool, as indicated at 1120. If, for instance, a transaction table or other information indicates a number of transactions (e.g., 20) which are indicated as acquired for processing by request processing threads and are set to a wait or suspend state, then the number of such database transactions may be calculated. In some embodiments, a counter or portion of metadata may be maintained which indicates the number of determined waiting transactions.

As indicated at 1130, based, at least in part, on the determined number of database transactions waiting, the fixed thread pool size may be dynamically adjusted such that an incoming access request is not blocked. Adjusting the thread pool may include increasing or decreasing the number of threads maintained in the thread pool, in various embodiments. For example, various thresholds, ratios, or other evaluated requirements may indicate that the number of threads in the request processing thread pool available to handle an incoming request is too small with regard to the number of outstanding commit requests (e.g., those commit requests that have not yet been received) for waiting database transactions (some of which may be prevented from making process due to one or more of the commit requests. Thus, a thread pool size increase event (or other flag or warning) may be triggered, and new threads created to according to an increased fixed thread pool size. Similarly, various thresholds, ratios, or other evaluated requirements may indicate that the number of threads in the request processing thread pool available to handle an incoming request is more than sufficient to handle the number of outstanding commit requests for waiting database transactions, in some embodiments, triggering a decrease in the fixed thread pool size. For instance, once a request processing thread has finished processing a current request, the request processing thread may be aborted to lower the number of threads. Aborting threads may continue until the desired smaller fixed thread pool size is achieved.

In some embodiments, thread pool size increases or decreases may be performed at a fixed number or interval (e.g., only add 2 new threads at a time). In this way, the fixed thread pool size may not increase too quickly. However, in some embodiments, the increase or decrease may be performed to increase or decrease the number of threads to a desired size without number or interval limitations. In some embodiments, decreasing the number of threads may return the fixed thread pool size to a default size (e.g., such as the optimal fixed thread pool size described above).

The method described in FIG. 11 may be performed dynamically, adjusting the fixed thread pool size for processing requests on the fly, as indicated by the loop back from adjusting at 1130 to determining at 1120. If, for instance, the number of database transactions waiting due to access requests related to a popular/important portion of data increases, the number of request processing threads may be increased to handle the increased workload directed to the portion of data. Once the number of waiting database transactions decreases, the number of requests processing threads may be decreased accordingly.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 12:
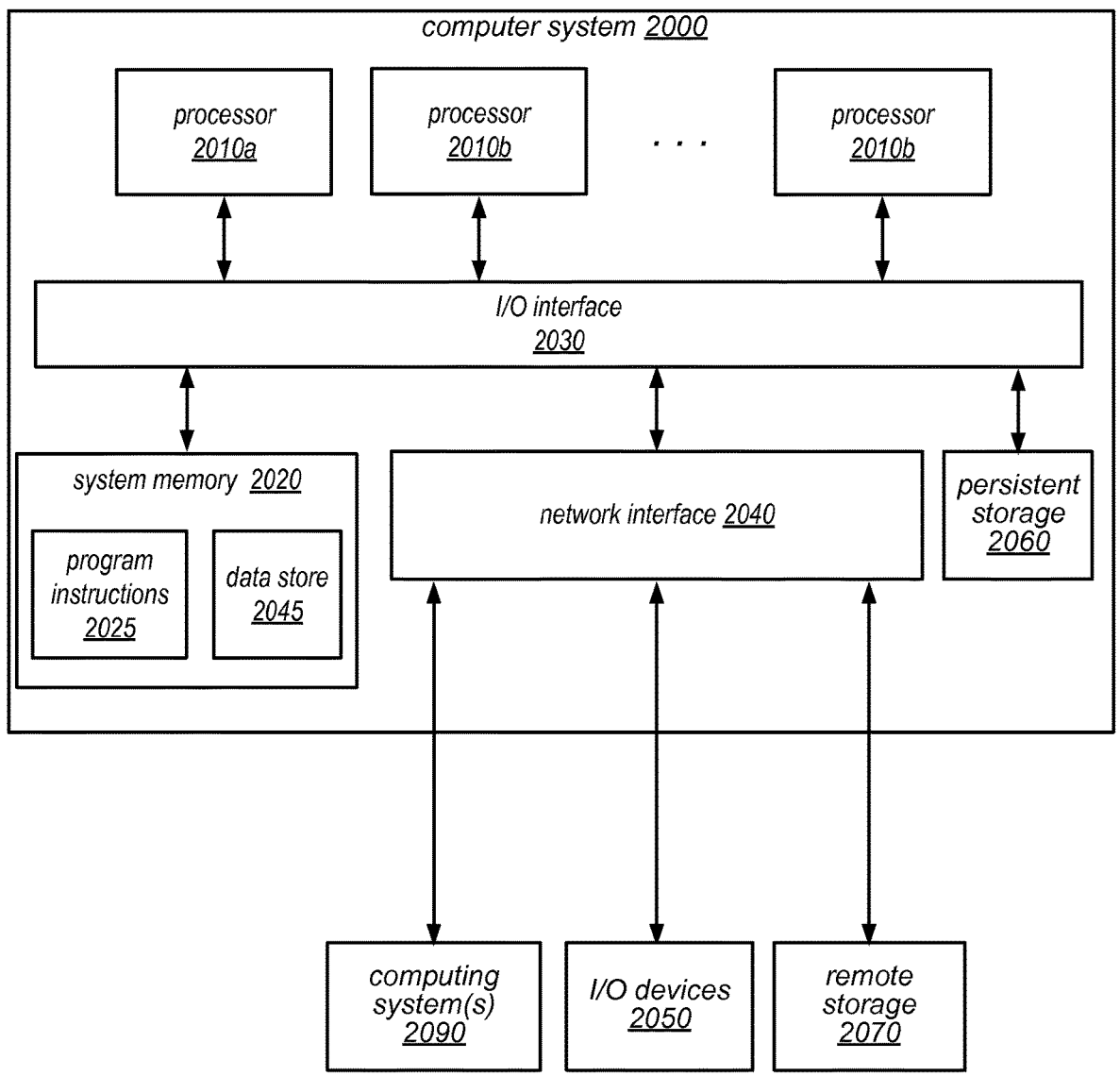
FIG. 12 is a block diagram illustrating a computer system, according to various embodiments.

FIG. 12 is a block diagram illustrating an example computer system, according to various embodiments. For example, computer system 2000 may be configured to implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed database-optimized storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
at least one processor;
a memory, comprising program instructions that when executed by the at least one processor cause the at least one processor to implement a database engine, wherein the database engine comprises:
  a request processing thread pool that comprises a plurality of request processing threads, wherein a number of the plurality of request processing threads is determined according to a thread pool size;

one or more response processing threads different from the plurality of request processing threads of the request processing thread pool;
the database engine, configured to:
while a particular response processing thread of the one or more response processing threads executes to detect completions of persistent storage I/O operations and process responses to access requests:
receive access requests for portions of data maintained as part of a database from one or more clients, wherein the access requests are dependent upon respective persistent storage input/output (I/O) operations to service the access requests such that processing of a particular access request enters a wait state until a respective persistent storage I/O operation is complete;
perform, by each request processing thread of two or more request processing threads from the request processing thread pool:
one or more processing operations to service a respective access request of the access requests such that the respective persistent storage I/O operation is performed for the respective access request;
in response to completion of the one or more processing operations for the access request, return the respective request processing thread to the request processing thread pool to make the respective request processing thread available to process another access request received at the database engine;
detect, by the executing particular response processing thread, that respective ones of the persistent storage I/O operations corresponding to respective access requests serviced by different ones of the plurality of request processing threads, are complete; and
in response to detection by the particular response processing thread that respective ones of the persistent storage operation are complete, send, by the particular response processing thread, respective responses for the respective access requests serviced by the different ones of the plurality of request processing threads to a client of the one or more clients, wherein the responses are based, at least in part, on respective results of the persistent storage I/O operations.

2. The system of claim 1,
wherein to perform the one or more processing operations, the database engine is configured to store a response template to be sent as the response in the memory; and
wherein to send the response for the access request to the client, the database engine is configured to access the memory to obtain the response template.

3. The system of claim 1, wherein the access request is a request to commit a database transaction, wherein the result of the persistent storage I/O operation is determined based, at least in part, on an acknowledgment that the persistent storage I/O operation completed successfully, and wherein the response indicates the database transaction is durable.

4. The system of claim 3, wherein the persistent storage I/O operation comprises an asynchronous write request for one or more log records to be written to a redo log for the database maintained at the persistent storage, and wherein the one or more redo log records indicate that the database transaction is committed.

5. A method, comprising:
performing, by one or more computing devices:
while a response processing thread executes to detect completions of persistent storage I/O operations and process responses to access requests:
receiving, at a database engine, access requests for portions of data maintained as part of a database from one or more clients, wherein the access requests are dependent upon respective persistent storage input/output (I/O) operations to service the access requests such that processing of a particular access request enters a wait state until a respective persistent storage I/O operation is complete;
performing, by each request processing thread of two or more request processing threads from a request processing thread pool:
one or more processing operations to service a respective access request of the access requests such that the respective persistent storage I/O operation is performed for the respective access request; and
in response to completing the one or more processing operations for the access request, making the respective request processing thread available to process another access request received at the database engine;
detecting, by the executing response processing thread, that respective ones of the persistent storage I/O operations, corresponding to respective access requests serviced by different request processing threads of the plurality of request processing thread pool, are complete, wherein the response processing thread is different from request processing threads of the request processing thread pool including the two or more request processing threads; and
sending, by the response processing thread in response to detecting that the respective ones of persistent storage I/O operations are complete, respective responses for the respective access requests including serviced by the different ones of the request processing threads to a client of the one or more clients, wherein the responses are based, at least in part, on respective results of the persistent storage I/O operations.

6. The method of claim 5, wherein the access request is a request to commit a database transaction, wherein the result of the persistent storage I/O operation is determined based, at least in part, on an acknowledgment that the persistent storage I/O operation completed successfully, and wherein the response indicates the database transaction is committed.

7. The method of claim 6, wherein the persistent storage I/O operation comprises writing one or more log records to a redo log for the database indicating that the database transaction is durable.

8. The method of claim 5,
wherein the one or more processing operations comprises storing a response template to be sent as the response in memory; and
wherein sending the response for the access request to the client comprises accessing the memory to obtain the response template.

9. The method of claim 5, wherein a number of the plurality of request processing threads in the request processing thread pool is determined according to a thread pool size.

10. The method of claim 9, further comprising:
  determining a number of database transactions waiting to be processed at the database engine; and
  based, at least in part, on the number of database transactions waiting to be processed, dynamically adjusting the thread pool size.

11. The method of claim 5, further comprising:
  receiving, at the database engine, a different access request for another portion of data maintained as part of the database from another client; and
  performing, by the request processing thread, one or more other processing operations to service the different access request, wherein the one or more other processing operations are completed prior to the completion of the persistent storage I/O operation for the access request.

12. The method of claim 5, wherein the database engine is implemented as part of a network-based database service, wherein the persistent storage for the database is implemented as part of a network-based storage service, wherein the network-based database service and the network-based storage service are implemented as part of the same network-based service platform, and wherein performing the persistent storage I/O operation comprises sending an asynchronous access request to the network-based storage service.

13. A non-transitory, computer-readable storage medium, storing program instructions that when executed by one or more computing devices cause the one or more computing devices to implement a database engine that implements:
  while a response processing thread executes to detect completions of persistent storage I/O operations and process responses to access requests:
    receiving, at a database engine, access requests for portions of data maintained as part of a database from one or more clients, wherein the access requests are dependent upon respective persistent storage input/output (I/O) operations to service the access requests such that processing of a particular access request enters a wait state until a respective persistent storage I/O operation is complete;
    performing, by each request processing thread of two or more request processing threads from a request processing thread pool:
      one or more processing operations to service a respective access request of the access requests such that the respective persistent storage I/O operation is performed for the respective access request; and
      in response to completing the one or more processing operations for the access request, making the respective request processing thread available to process another access request received at the database engine;
    detecting, by the executing response processing thread, that respective ones of the persistent storage I/O operations, corresponding to respective access requests serviced by different request processing threads of the request processing thread pool, are complete, wherein the response processing thread is different from request processing threads of the request processing thread pool including the two or more request processing threads; and
    sending, by the response processing thread in response to detecting that the respective ones of persistent storage I/O operations are complete, respective responses for the respective access requests serviced by the different ones of the request processing threads to a client of the one or more clients, wherein the responses are based, at least in part, on respective results of the persistent storage I/O operations.

14. The non-transitory, computer-readable storage medium of claim 13, wherein the access request is a request to commit a database transaction, wherein the result of the persistent storage I/O operation is determined based, at least in part, on an acknowledgment that the persistent storage I/O operation completed successfully, and wherein the response indicates the database transaction is durable.

15. The non-transitory, computer-readable storage medium of claim 14, wherein, in performing the one or more processing operations, the database engine implements grouping the commit request with one or more other commit requests, wherein the persistent storage I/O operation is performed for the commit request and the one or more other commit requests in the group of commit requests.

16. The non-transitory, computer-readable storage medium of claim 14, wherein the persistent storage I/O operation comprises writing one or more log records to a redo log for the database indicating that the database transaction is durable.

17. The non-transitory, computer-readable storage medium of claim 13,
  wherein the one or more processing operations comprises storing a response template to be sent as the response in memory; and
  wherein, in sending the response for the access request to the client, the database engine further implements accessing the memory to obtain the response template.

18. The non-transitory, computer-readable storage medium of claim 13, wherein a number of the plurality of request processing threads in the request processing thread pool is determined according to a thread pool size, and wherein the database engine further implements:
  determining a number of database transactions waiting to be processed at the database engine; and
  based, at least in part, on the number of database transactions waiting to be processed, increasing the thread pool size such that at least one request processing thread of the increased thread pool is available to process a subsequently received access request.

19. The non-transitory, computer-readable storage medium of claim 13, wherein the request processing thread is one of a plurality of request processing threads that together comprise a request processing thread pool, wherein a number of the plurality of request processing threads in the request processing thread pool is determined according to a thread pool size, and wherein the database engine further implements:
  determining a number of database transactions waiting to be processed at the database engine; and
  based, at least in part, on the number of database transactions waiting to be processed, decreasing the thread pool size.

20. The non-transitory, computer-readable storage medium of claim 13, wherein the persistent storage is a distributed storage system, wherein the distributed storage system comprises a plurality of storage nodes maintaining the data for the database, and wherein performing the persistent storage I/O operation comprises sending an asynchronous access request to different ones of the plurality of storage nodes.

* * * * *